United States Patent
Yeh et al.

(10) Patent No.: US 8,569,636 B2
(45) Date of Patent: Oct. 29, 2013

(54) HANDWRITTEN INPUT DEVICE AND AN ANGLE CORRECTING METHOD THEREOF

(75) Inventors: Yun-Hsiang Yeh, Miaoli (TW); Chang-Sian Chen, Hsin-Chu (TW)

(73) Assignee: Waltop International Corporation, Hsin-Chu (TW)

( * ) Notice: Subject to any disclaimer, the term of this patent is extended or adjusted under 35 U.S.C. 154(b) by 382 days.

(21) Appl. No.: 12/955,555

(22) Filed: Nov. 29, 2010

(65) Prior Publication Data

US 2012/0037433 A1    Feb. 16, 2012

(30) Foreign Application Priority Data

Aug. 16, 2010  (TW) .............................. 99127366 A (51) Int. Cl.
*G06F 3/041*    (2006.01)

(52) U.S. Cl.
USPC ........ 178/18.02; 345/156; 345/174; 345/179; 178/18.01; 178/19.07; 178/19.01

(58) Field of Classification Search
USPC .............. 345/173, 178, 156, 158, 174, 179; 178/18.01–18.09, 19.01–19.07, 178/20.01–20.04

See application file for complete search history.

(56) References Cited

U.S. PATENT DOCUMENTS

| | | | | |
|---|---|---|---|---|
| 4,577,057 | A | * | 3/1986 | Blesser ...................... 178/19.01 |
| 5,198,623 | A | * | 3/1993 | Landmeier ................ 178/18.02 |
| 5,748,110 | A | * | 5/1998 | Sekizawa et al. ................. 341/5 |
| 5,751,229 | A | * | 5/1998 | Funahashi ......................... 341/5 |
| 2008/0136784 | A1 | * | 6/2008 | Neoh et al. ..................... 345/173 |

* cited by examiner

*Primary Examiner* — Lun-Yi Lao
*Assistant Examiner* — Md Saiful A Siddiqui
(74) *Attorney, Agent, or Firm* — Muncy, Geissler, Olds & Lowe, PLLC (57) ABSTRACT

An angle correcting method for a position pointer induced by a handwritten input device is disclosed. The steps of the method includes: firstly, an inclined angle table is provided. Then, a first induced voltage amplitude of a first position where the position pointer touches and a second induced voltage amplitude of a second position where is near to the first position are induced. The ratio of the first induced voltage amplitude to the second induced voltage amplitude is calculated to generate an amplitude ratio. Finally, the inclined angle table is looked up to find an inclined angle according to the amplitude ratio.

7 Claims, 9 Drawing Sheets

FIG. 4C 5 inclined angle table

| ratio | degree |
|---|---|
| 20 | 45 |
| 30 | 60 |
| 40 | 90 |
| 50 | 135 |
| 60 | 160 |
| ⋮ | ⋮ |

| FIG. 6a |
| FIG. 6b |

HANDWRITTEN INPUT DEVICE AND AN ANGLE CORRECTING METHOD THEREOF

BACKGROUND OF THE INVENTION

1. Field of the Invention

The present invention generally relates to an angle correcting method, and more particularly to an inclined angle correcting method on the border of a tablet.

2. Description of the Prior Art

Various touch sensitive inputting devices, such as the Tablet PCs, incorporate a computer display to perform sensing technology. The device detects the position of a position pointer or a touched sensing surface by a finger to generate the corresponding coordinates, and further interact with a computer device. The common sensing devices utilize various sensing technology such as resistive, capacitive, or optical sensing technology to perform sensing.

Figure 1:
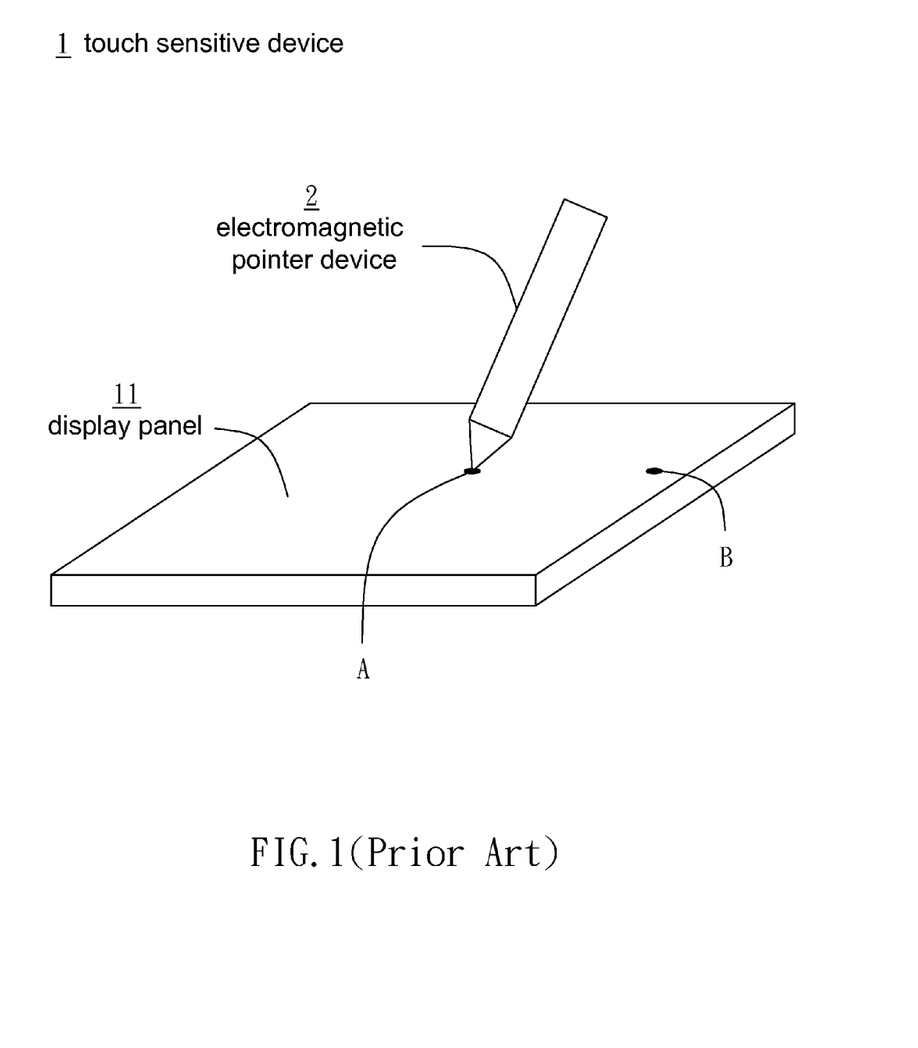
FIG. 1 shows a schematic diagram of a conventional electromagnetic touch sensitive device.

Please refer to FIG. 1, which shows a schematic diagram of a conventional electromagnetic touch sensitive device (abbreviated as the touch sensitive device hereinafter). The touch sensitive device 1 is operated with an electromagnetic pointer device 2. The touch sensitive device 1 includes a display panel 11 and an inductive loops layer (not shown). The inductive loops layer is disposed under the display panel 11 to induce the electromagnetic signal transmitted from the electromagnetic pointer device 2. When the electromagnetic pointer device 2 is approached the display panel 11 and transmits the electromagnetic signal, these inductive loops will determine the information such as written position, trace, or pressure according to the received electromagnetic signal. However, because the display panel 11 is disposed between the inductive loops layer and the electromagnetic pointer device 2, and the display panel 11 has a depth itself, it results in a refraction angle between the inductive loops layer and the electromagnetic signal transmitted from the electromagnetic pointer device 2. Therefore, a parallax between the positions of the cursor and pen point of the electromagnetic pointer device 2 may be generated. The more leaning the electromagnetic pointer device 2 is or the more depth the display panel 11 has, the more parallax between the cursor and pen point of the electromagnetic pointer device 2 it generates.

Figure 2:
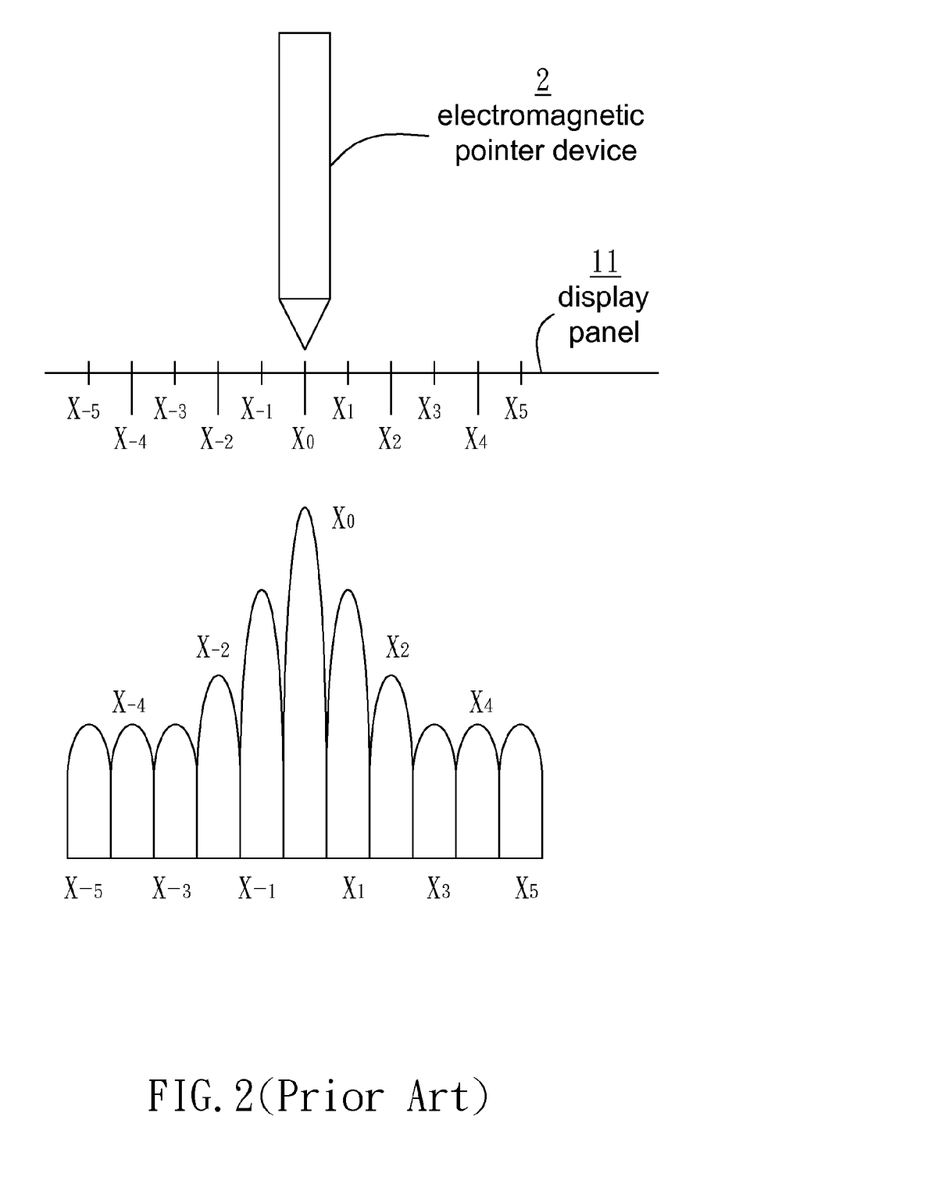
FIG. 2 shows the variation of the magnetic field inducted by the electromagnetic pointer device.

In view of forgoing, it must incorporates with the mechanism for detecting the inclined angle of the electromagnetic pointer device 2 when designing the touch sensitive device 1, thereby adjusting or compensating the trace position displayed according to the inclined angle. Please moreover refer to FIG. 2, which shows the variation of the magnetic field induced by the electromagnetic pointer device 2. When the electromagnetic pointer device 2 approaches the display panel 11 perpendicularly, the electromagnetic signal in the position $X_{-5}$-$X_5$ will be induced as shown in FIG. 2. Wherein, it has the strongest electromagnetic signal in the position $X_0$ nearest to the pen point of the electromagnetic pointer device 2. The intensity of the electromagnetic signal may be decreased progressively and symmetrically toward around. The inclined angle of the electromagnetic pointer device 2 can be determined by computing the ratio of the voltage values of the strongest electromagnetic signal induced in the position $X_0$ to the electromagnetic signal inducted in the position $X_{-5}$ or $X_5$.

When the electromagnetic pointer device 2 approaches the display panel 11 at point A, the inclined angle can be determined according to above method. However, it can not work when the electromagnetic pointer device 2 approaches at point B which is located on the border of the display panel 11. The inductive loops layer could not induct the voltage value on the right side (about the position $X_4$ or $X_5$) near the border of the display panel 11, thereby the inclined angle can not be determined effectively.

SUMMARY OF THE INVENTION

In order to solve above problem, it is an object of the embodiments of the present invention to provide a handwritten input device and an inclined angle correcting method on the border of a tablet thereof.

According to one embodiment of the present invention, an angle correcting method for a position pointer inducted by a handwritten input device is disclosed. The steps of the method includes: firstly, an inclined angle table is provided. Then, a first inducted voltage amplitude of a first position where the position pointer touches is inducted. And a second inducted voltage amplitude of a second position where is at a predetermined distance from the first position is inducted. The ratio of the first inducted voltage amplitude to the second inducted voltage amplitude is calculated to generate an amplitude ratio. Finally, the inclined angle table is looked up to find an inclined angle according to the amplitude ratio.

According to another embodiment of the present invention, a handwritten input device for inducing a position pointer is disclosed. The handwritten input device comprises a storage unit, a sensing module and a microprocessor. The storage unit is disposed to store an inclined angle table. The sensing module is disposed to induct a first inducted voltage amplitude of a first position where the position pointer touches and a second inducted voltage amplitude of a second position where is at a predetermined distance from the first position is inducted. The microprocessor coupled between the storage unit and the sensing module is disposed to calculate the ratio of the first inducted voltage amplitude to the second inducted voltage amplitude to generate an amplitude ratio. Furthermore, the microprocessor looks up the inclined angle table to find a corresponding inclined angle according to the amplitude ratio. Whereby, the position shown on the handwritten input device of the first position would be adjusted according to the inclined angle found, or the first inducted voltage amplitude generated may be compensated adaptively.

DETAILED DESCRIPTION OF THE INVENTION

According to the handwritten input device and the inclined angle correcting method on the border thereof of the present invention, the corresponding inclined angle would be determined by looking up a table according to the signal of the voltage amplitude ratio, therefore correcting the inclined angle on the border part of the handwritten input device effectively.

Figure 3:
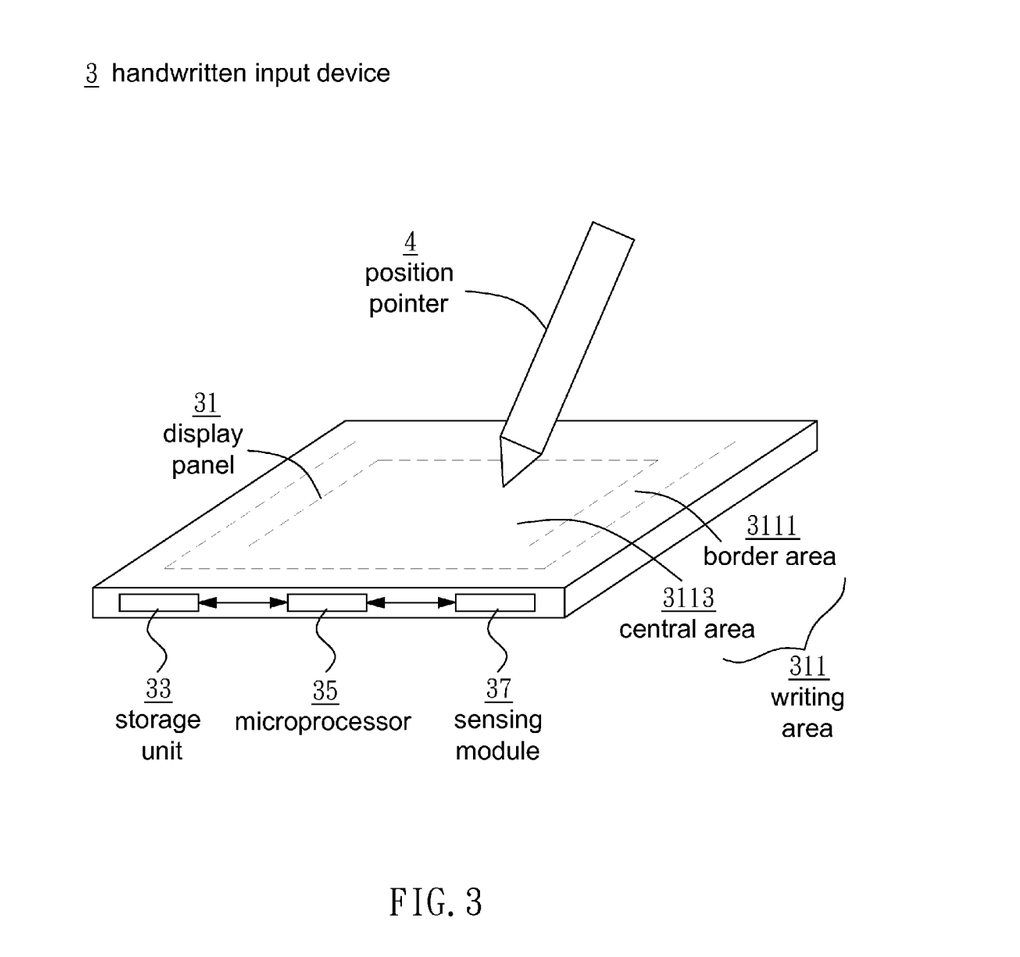
FIG. 3 shows an architecture diagram that illustrates a handwritten input device according to one embodiment of the present invention.

Firstly, please refer to the FIG. 3, which shows an architecture diagram that illustrates a handwritten input device according to one embodiment of the present invention. The handwritten input device 3 is used to induct a position pointer 4 to generate a corresponding coordinates. Specifically, the handwritten input device 3 comprises an electromagnetic inductive digitizer or any other electromagnetic inductive input device. The position pointer 4 comprises an electromagnetic pointer device 2, and which comprises a pen-shaped container to contain a magnetic element (not shown). A coil having stranded wires is usually wound around the outer surface of the magnetic element, which generates oscillation to facilitate the handwritten input device 3 to computer the location information. In addition, the shape of the position pointer 4 may be various and it may contain, but not limited to, more conventional elements.

The handwritten input device 3 comprises a display panel 31, a storage unit 33, a sensing module 37 and a microprocessor 35. The display panel 31 has a writing area 311, which is divided into two parts, a central area 3113 and a border area 3111. The sensing module is disposed to induct the position and the voltage amplitude generated where the position pointer 4 touches. In one embodiment, the sensing module 37 has an inductive loops layer which is a grid-net-shaped inductive loop, and it is disposed under the display panel 31. When the position pointer 4 is close to the display panel 31, the voltage value around the touched point may be inducted by the sensing module 37. The microprocessor 35 may determine the inclined angle of the position pointer 4 according to the ratio of the voltage values inducted.

Figure 4A:
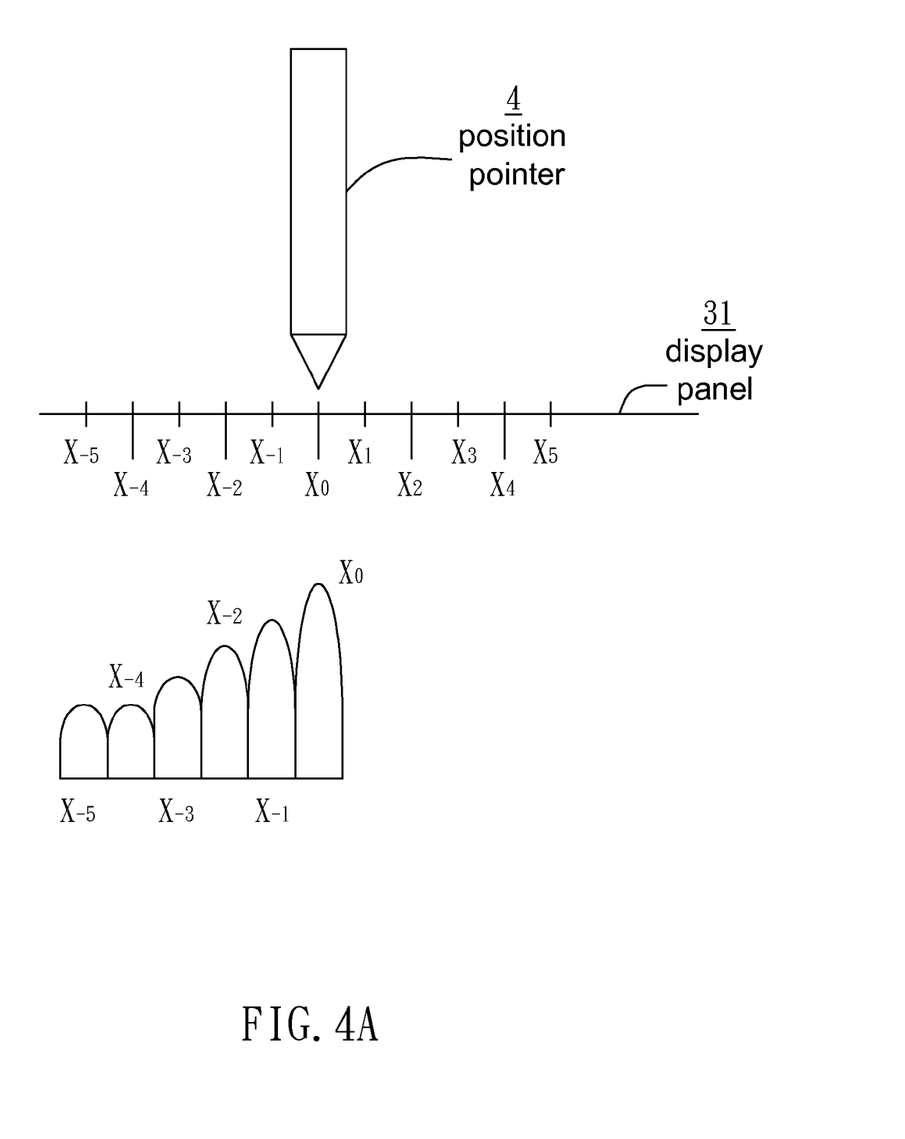
FIG. 4A to 4C show a diagram that illustrates the inducted voltage amplitude on the border-right of the tablet according to one embodiment of the present invention.
Figure 4B:
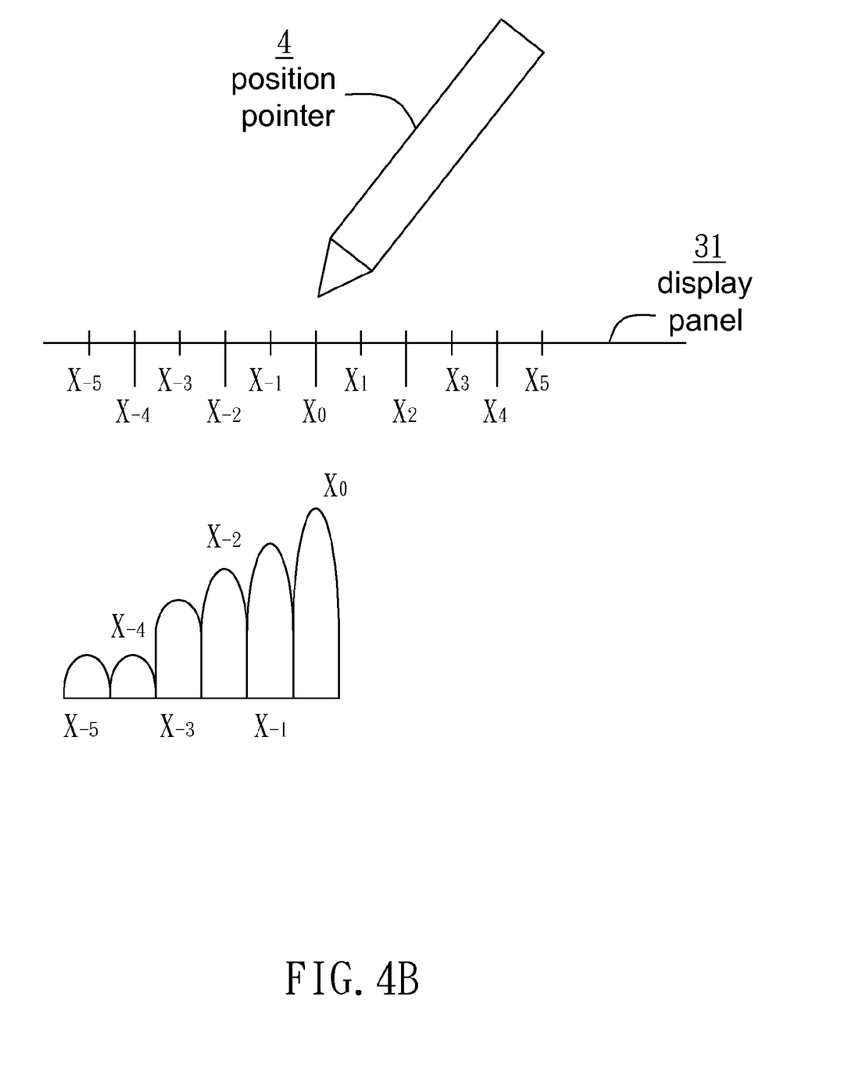
Figure 4C:
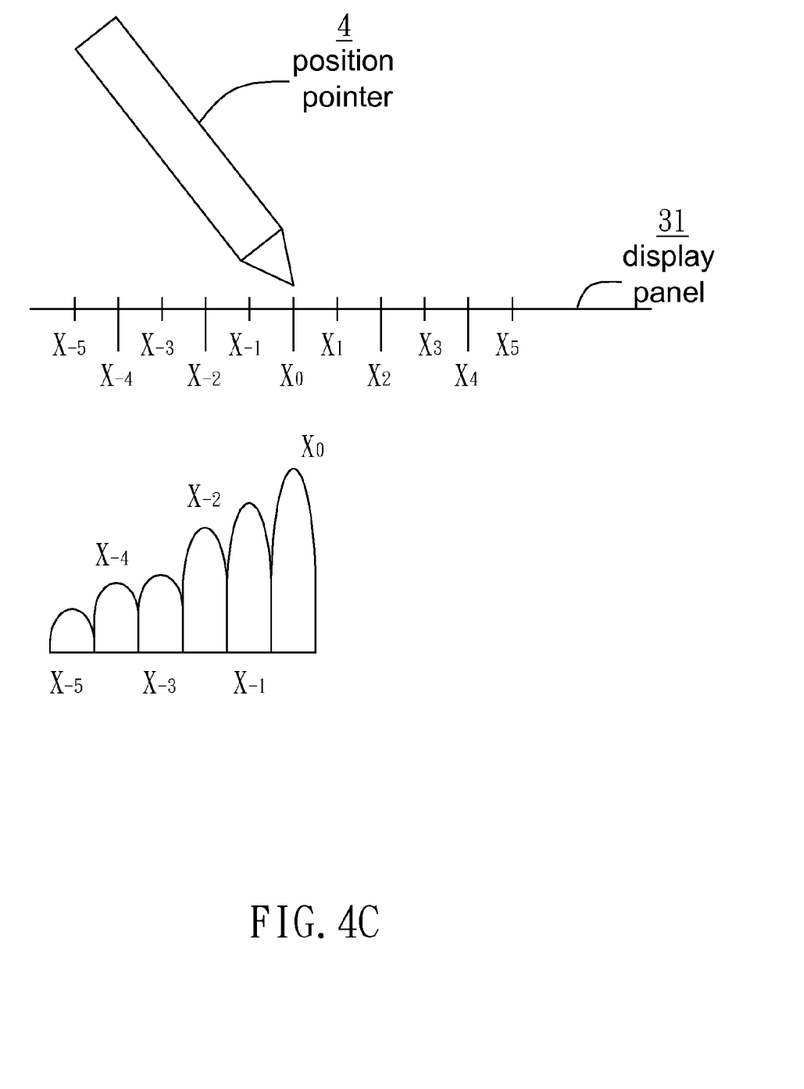

However, if the position pointer 4 touches the border area 3111 of the display panel 31, a portion of voltage values cannot be inducted. Please refer to the FIG. 4A-4C, which show a diagram that illustrates the inducted voltage amplitude on the border-right of the tablet according to one embodiment of the present invention. When the position pointer 4 touches the most right side of the border area 3111 of the display panel 31, because of its lack of inductive loops on the right side of the touched point, the sensing module 37 only could induct the voltage values and the voltage amplitudes in the positions $X_{-5}$-$X_0$. Wherein, the voltage amplitude of the position which is close to the position pointer 4 is the strongest, and the intensity of the electromagnetic signal may be decreased progressively and symmetrically toward around. It is worth to notice that the inclined angle of the position pointer 4 may affect the voltage amplitudes in the positions $X_{-5}$ or $X_{-4}$. As shown in FIGS. 4A and 4B, the position pointer 4 approaches the display panel 31 perpendicularly and right-obliquely, respectively, thus the voltage amplitude inducted of the FIG. 4A is bigger than the voltage amplitude inducted of the FIG. 4B in the same position $X_{-5}$. When the position pointer 4 approaches the display panel 31 left-obliquely, as shown in FIG. 4C, the voltage amplitude inducted in the position $X_{-5}$ may be variant according to the inclined angle of the position pointer 4. Similarly, the above condition may occur when the position pointer 4 touches the most left side of the border area 3111 of the display panel 31.

Figure 5:
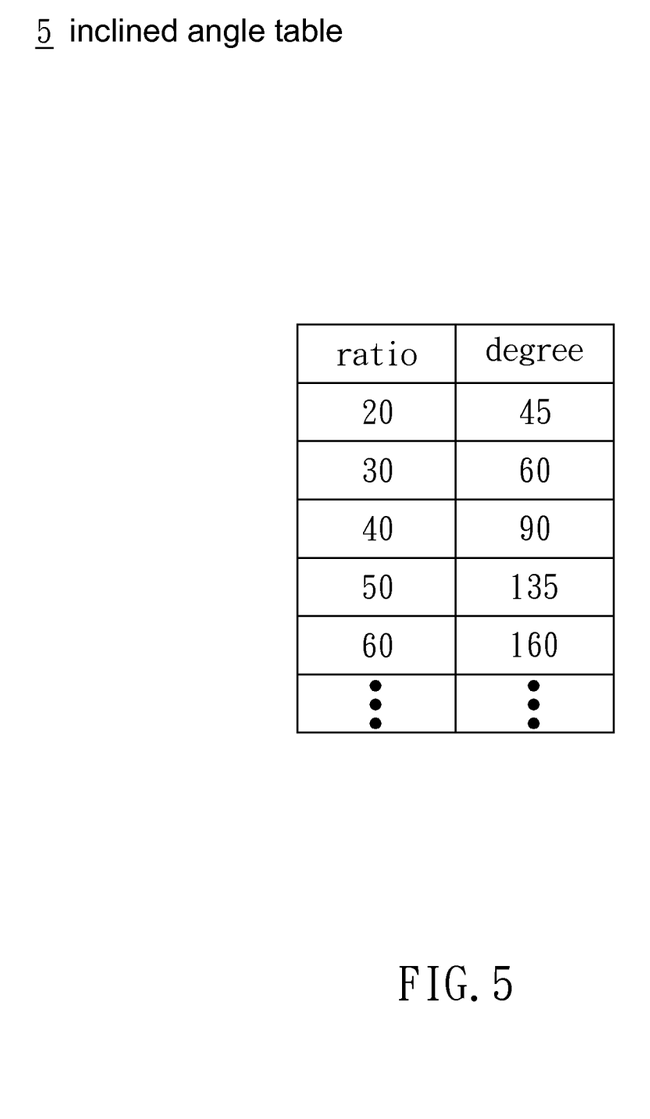
FIG. 5 shows a diagram that illustrates an inclined angle table according to one embodiment of the present invention.

In view of the above characteristic, it gathers the amplitude ratios in various inclined angles in the present invention, wherein each of the amplitude ratios is the ratio of the inducted voltage amplitude of a touched point (e.g. position $X_0$) where the position pointer 4 touch to the inducted voltage amplitude of the position where is at a predetermined distance from the touched point (e.g. position $X_{-5}$). Therefore, an inclined angle table 5 would be obtained, as shown in FIG. 5. In one embodiment, the inclined angle table 5 is stored in the storage unit 33.

In one embodiment, the microprocessor is coupled between the storage unit 33 and the sensing module 37. When the position pointer 4 touches a first position (e.g. position $X_0$) on the display panel 31, the sensing module 37 inducts a first induced voltage amplitude in the first position and induces a second induced voltage amplitude in a second position (e.g. position $X_{-5}$) where is at a predetermined distance from the first position. The microprocessor 35 then calculates the ratio of the first inducted voltage amplitude to the second inducted voltage amplitude to generate an amplitude ratio, and looks up the inclined angle table 5 to find a corresponding inclined angle according to the amplitude ratio calculated. For example, if the amplitude ratio calculated is 40, the inclined angle of the position pointer 4 can be determined as 90 degree by looking up the inclined angle table 5. Wherein, the more difference of the intensity between the first and the second inducted voltage amplitudes is, the bigger the inclined angle found by looking up the inclined angle table 5 is. On the contrary, the less difference of the intensity between the first and the second inducted voltage amplitudes is, the smaller the inclined angle found by looking up the inclined angle table 5 is. Accordingly, the writing trace of the position pointer 4 would be adjusted adaptively to show on the handwritten input device 3 according to the inclined angle found, or the first inducted voltage amplitude inducted may be compensated adaptively. For instance, if the inclined angle is 30 degree, the first inducted voltage amplitude inducted at the touched point would be a little small (compare with 90 degree), so it can be compensated adaptively.

It is worth to notice that the inclined angle table 5 is generated according to the ratio of the inducted voltage amplitudes inducted by the loops in positions $X_0$ and $X_{-5}$. However, the inclined angle table 5 can be generated, but not limited to, according to ratio of the inducted voltage amplitudes inducted by the loops in positions $X_0$ and $X_4$ or according to any variation of the voltage amplitudes.

In one embodiment of the present invention, before touching the first position on the display panel 31 by the position pointer 4, whether the first position is located within the central area 3113 or not would be determined. If yes, the inclined angle can be calculated according to the variation of the voltage values. On the contrary, if no, the inclined angle can be determined according to the method disclosed in the present invention. Certainly, the inclined angle within the whole writing area 311 can be determined according to the method disclosed in the present invention.

Figure 6A:
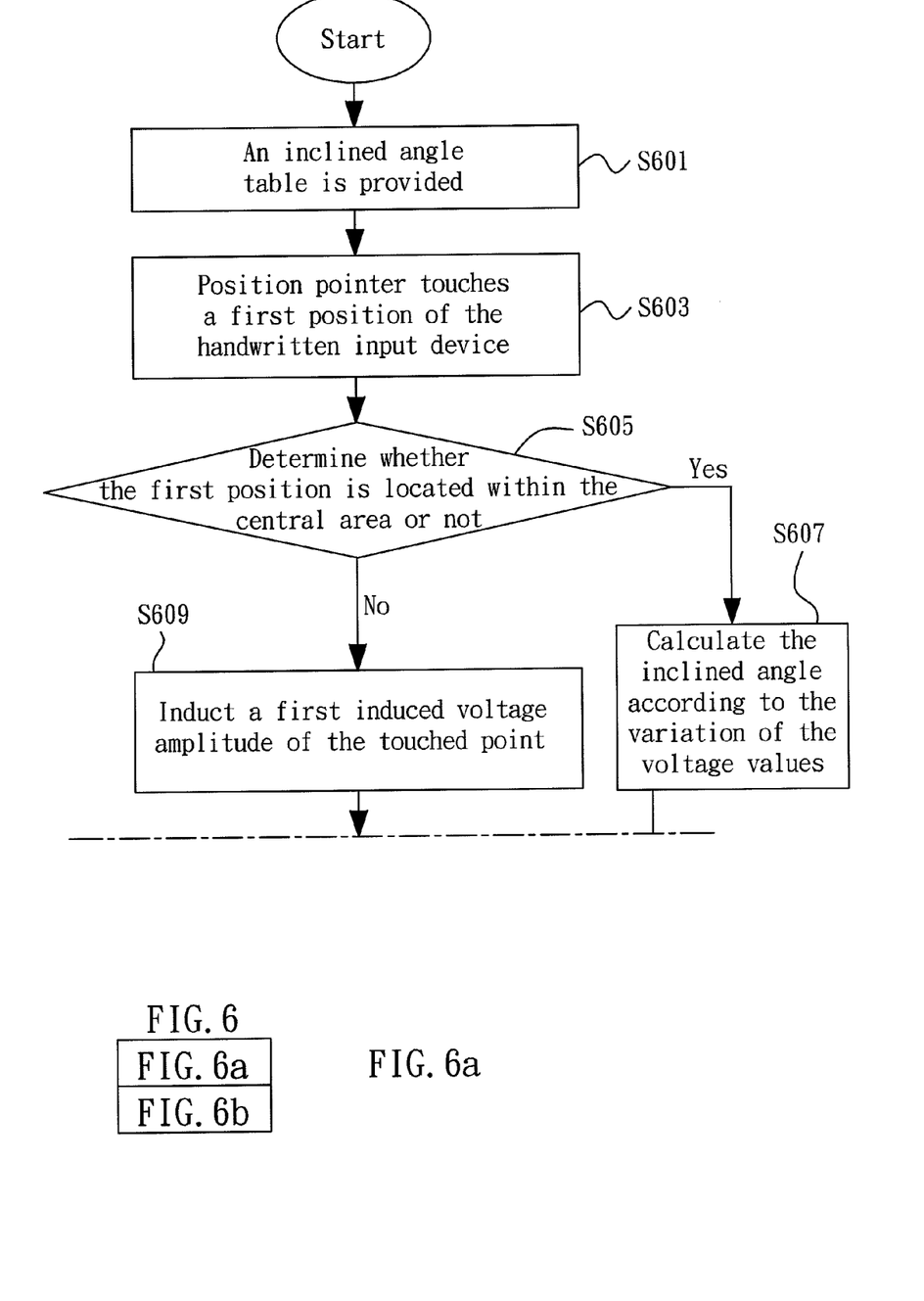
FIGS. 6A and 6B show a flow diagram that illustrates an angle correcting method according to another embodiment of the present invention.
Figure 6B:
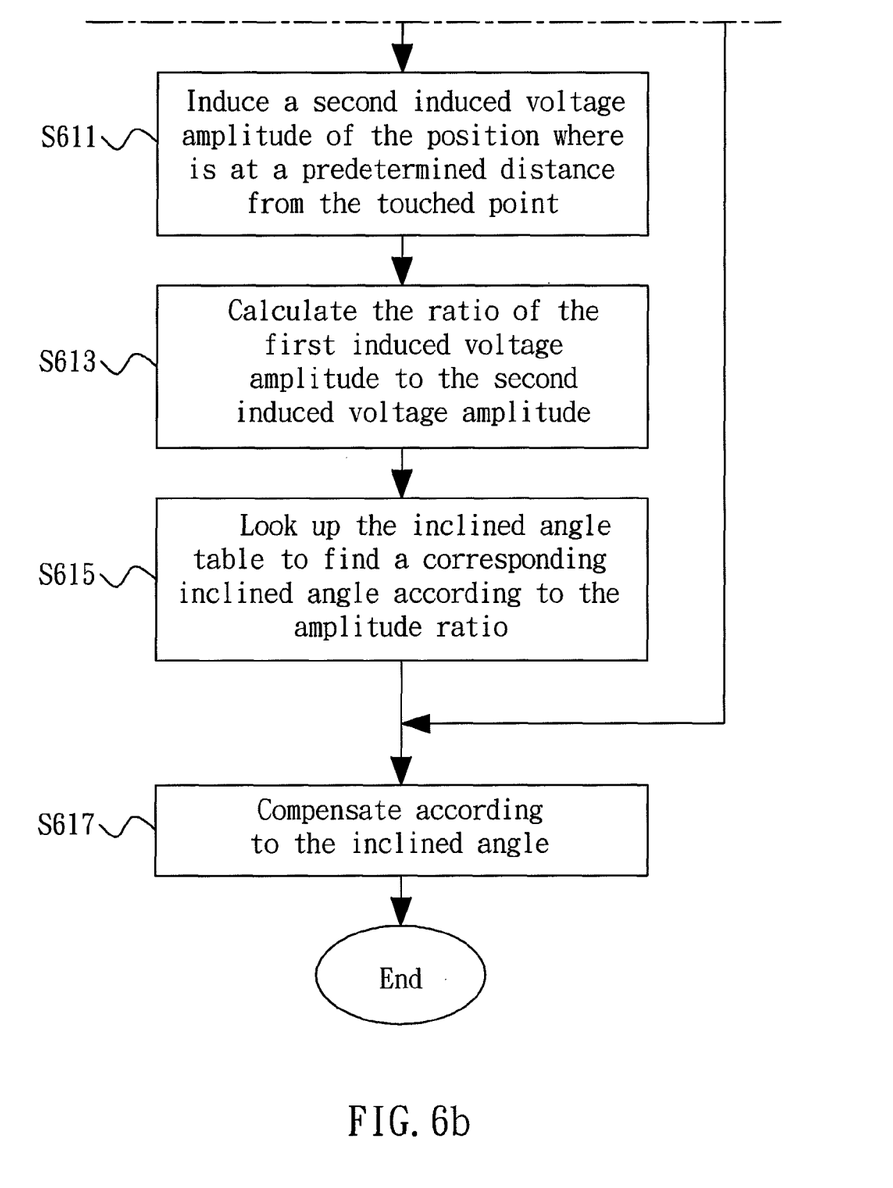

Finally, please refer to FIGS. 6A and 6B, which show a flow diagram that illustrates an angle correcting method according to another embodiment of the present invention. The corresponding system architectures are shown in FIG. 3-5. As shown in FIGS. 6A and 6B, the angle correcting method comprises the following steps:

Firstly, an inclined angle table 5 stored in the storage unit 33 is provided (step 601); then the position pointer 4 is used to touch (or be close to) a first position (e.g. position $X_0$) of the handwritten input device 3 (step 603). The microprocessor 35 immediately determines whether the first position is located within the central area 3113 or not according to the location information inducted by the sensing module 37 (step 605). If yes, the microprocessor 35 calculate the inclined angle according to the variation of the voltage values inducted (step 607).

If determining the first position is not located within the central area 3113 in the step 605, the sensing module 37 inducts a first inducted voltage amplitude of the touched point (first position) (step 609), and at the same time inducts a second inducted voltage amplitude of a second position (e.g. position $X_{-5}$) where is at a predetermined distance from the first position (step 611). In one embodiment, the predetermined distance is about at a distance of 4 or 5 loops and the second position is more nearer the central area 3113 than the first position.

Further, the microprocessor 35 calculates the ratio of the first inducted voltage amplitude to the second inducted voltage amplitude to generate an amplitude ratio (step 613). Then, the microprocessor 35 looks up the inclined angle table 5 to find a corresponding inclined angle according to the amplitude ratio calculated (step 615). Finally, the writing trace from the first position would be adjusted adaptively according to the inclined angle found, or the first inducted voltage amplitude inducted may be compensated adaptively (step 617).

Although specific embodiments have been illustrated and described, it will be appreciated by those skilled in the art that various modifications may be made without departing from the scope of the present invention, which is intended to be limited solely by the appended claims.

What is claimed is:

1. An angle correcting method for a position pointer inducted by a handwritten input device, comprising:
    providing an inclined angle table;
    inducing a first inducted voltage amplitude generated in a first position, where the position pointer touches, of the handwritten input device;
    inducing a second inducted voltage amplitude in a second position where is at a predetermined distance from the first position;
    calculating the ratio of the first inducted voltage amplitude to the second inducted voltage amplitude to generate an amplitude ratio; and
    determining whether the first position is located within a central area or not, wherein the handwritten input device has a writing area, which is divided into at least two parts, the central area and a border area,
    looking up the inclined angle table to find a corresponding inclined angle according to the amplitude ratio;
    whereby, the first position will be adjusted adaptively according to the inclined angle found, or the first inducted voltage amplitude inducted will be compensated adaptively,
    wherein the more difference of intensity between the first and the second inducted voltage amplitudes is, the bigger the inclined angle and the less difference of the intensity between the first and the second inducted voltage amplitudes is, the smaller the inclined angle found by looking up the inclined angle table is.

2. The method of claim 1, wherein the handwritten input device comprises an electromagnetic inductive digitizer.

3. The method of claim 1, wherein the position pointer comprises an electromagnetic pointer device.

4. A handwritten input device for inducting a position pointer, comprising:
    a storage unit disposed to store an inclined angle table;
    a sensing module disposed to induct a first inducted voltage amplitude of a first position where the position pointer touches and induct a second inducted voltage amplitude of a second position where is at a predetermined distance from the first position; and
    a microprocessor coupled between the storage unit and the sensing module and disposed to calculate the ratio of the first inducted voltage amplitude to the second inducted voltage amplitude to generate an amplitude ratio, wherein the microprocessor immediately determines whether the first position is located within a central area of the handwritten input device or not according to a location information inducted by the sensing module and then looks up the inclined angle table to find a corresponding inclined angle according to the amplitude ratio if the first position is located within the central area;
    whereby, the first position will be adjusted adaptively according to the inclined angle found, or the first inducted voltage amplitude inducted will be compensated adaptively,
    wherein the more difference of intensity between the first and the second inducted voltage amplitudes is, the bigger the inclined angle and the less difference of the intensity between the first and the second inducted voltage amplitudes is, the smaller the inclined angle found by looking up the inclined angle table is.

5. The handwritten input device of claim 4, wherein the handwritten input device comprises an electromagnetic inductive digitizer.

6. The handwritten input device of claim 4, wherein the position pointer comprises an electromagnetic pointer device.

7. The handwritten input device of claim 6, wherein electromagnetic pointer device comprises:
    a container;
    a magnetic element disposed on the inside of the container; and
    a coil having stranded wires, the coil is wound around the outer surface of the magnetic element to generate magnetic field.

* * * * *